(12) United States Patent
Scaringe

(10) Patent No.: US 10,207,757 B2
(45) Date of Patent: Feb. 19, 2019

(54) SYSTEMS AND METHODS FOR RECONFIGURABLE ELECTRIC VEHICLES

(71) Applicant: Rivian IP Holdings, LLC, Livonia, MI (US)

(72) Inventor: Robert J. Scaringe, Plymouth, MI (US)

(73) Assignee: Rivian IP Holdings, LLC, Plymouth, MI (US)

(*) Notice: Subject to any disclaimer, the term of this patent is extended or adjusted under 35 U.S.C. 154(b) by 0 days.

(21) Appl. No.: 15/403,868

(22) Filed: Jan. 11, 2017

(65) Prior Publication Data
US 2017/0197678 A1    Jul. 13, 2017

Related U.S. Application Data

(60) Provisional application No. 62/277,919, filed on Jan. 12, 2016.

(51) Int. Cl.
*B62D 63/02*     (2006.01)
*B60G 13/10*     (2006.01)
(Continued)

(52) U.S. Cl.
CPC .............. *B62D 63/025* (2013.01); *B60K 1/00* (2013.01); *B60K 1/04* (2013.01); *B60K 17/354* (2013.01);
(Continued)

(58) Field of Classification Search
CPC ........ B62D 63/025; B60G 13/10; B60K 1/02; G06Q 30/0645
(Continued)

(56) References Cited

U.S. PATENT DOCUMENTS 2,512,798 A    6/1950 Hodges
3,897,100 A    7/1975 Gardner
(Continued)

FOREIGN PATENT DOCUMENTS

WO    2014/194409    12/2014

OTHER PUBLICATIONS

Patent Cooperation Treaty, International Search Report, PCT/US2017/012956, dated Jun. 1, 2017.
(Continued)

*Primary Examiner* — Yazan A Soofi
(74) *Attorney, Agent, or Firm* — Jones Day

(57) ABSTRACT

Utilization of shared vehicles that are structurally and reversibly reconfigurable to suit requests for particular vehicle configurations is described. Vehicle use is monitored for plural vehicles shared among multiple users/uses. In response to a first request for a first particular configuration of a vehicle, a first vehicle is selected/provided in the first particular configuration having a predetermined first feature set, the first feature set being automatically set based on the first vehicle being placed in the first particular configuration. In response to a second use request for a second particular configuration of a vehicle different from the first particular configuration, the first vehicle is selected/provided in the second particular configuration having a predetermined second feature set, the second feature set being automatically set at the first vehicle based on the first vehicle being placed in the second particular configuration, the first feature set being different from the second feature set.

39 Claims, 5 Drawing Sheets

(51) Int. Cl.
*B60K 1/02* (2006.01)
*B60R 16/037* (2006.01)
*G06Q 30/06* (2012.01)
*B60K 1/00* (2006.01)
*B60K 1/04* (2006.01)
*B60K 17/354* (2006.01)
*B60K 17/356* (2006.01)
*B60P 3/42* (2006.01)

(52) U.S. Cl.
CPC ...... *B60K 17/356* (2013.01); *B60K 2001/001* (2013.01); *B60K 2001/0438* (2013.01); *B60P 3/42* (2013.01); *B60R 16/037* (2013.01); *B60Y 2300/045* (2013.01); *B60Y 2400/204* (2013.01); *B60Y 2410/111* (2013.01)

(58) Field of Classification Search
USPC ....................................................... 701/29
See application file for complete search history.

(56) References Cited

U.S. PATENT DOCUMENTS

| | | | |
|---|---|---|---|
| 4,810,158 A | 3/1989 | Bitzer | |
| 4,842,326 A | 6/1989 | DiVito | |
| 5,470,124 A | 11/1995 | Ernst | |
| 5,707,101 A | 1/1998 | Rice | |
| 5,785,485 A | 7/1998 | Hall | |
| 6,059,058 A | 5/2000 | Dower | |
| 6,312,034 B1 | 11/2001 | Coleman, II et al. | |
| 7,107,129 B2 | 9/2006 | Rowe et al. | |
| 7,303,033 B2 | 12/2007 | Chernoff et al. | |
| 7,441,615 B2 | 10/2008 | Borroni-Bird et al. | |
| 7,714,708 B2 | 5/2010 | Brackmann et al. | |
| 8,727,426 B2 | 5/2014 | Vitale et al. | |
| 8,925,777 B1 | 1/2015 | Casucci et al. | |
| 9,327,632 B1 | 5/2016 | Bartel | |
| 9,809,096 B1 | 11/2017 | DeMonte et al. | |
| 9,845,123 B2 | 12/2017 | Byrnes et al. | |
| 2003/0123965 A1 | 7/2003 | Brackmann et al. | |
| 2007/0173987 A1 | 7/2007 | Rowe et al. | |
| 2015/0057839 A1* | 2/2015 | Chang .................. | B60R 16/037 701/2 |
| 2015/0180710 A1* | 6/2015 | Cazanas ................ | H04L 41/082 709/221 |
| 2015/0217780 A1* | 8/2015 | Chen .................... | B60R 16/037 701/2 |
| 2017/0197679 A1 | 7/2017 | Scaringe et al. | |

OTHER PUBLICATIONS

Patent Cooperation Treaty, Written Opinion of the International Searching Authority, PCT/US2017/012956, dated Jun. 1, 2017.
Office Action dated Mar. 27, 2018 in copending U.S. Appl. No. 15/403,870, 16 pages.

\* cited by examiner

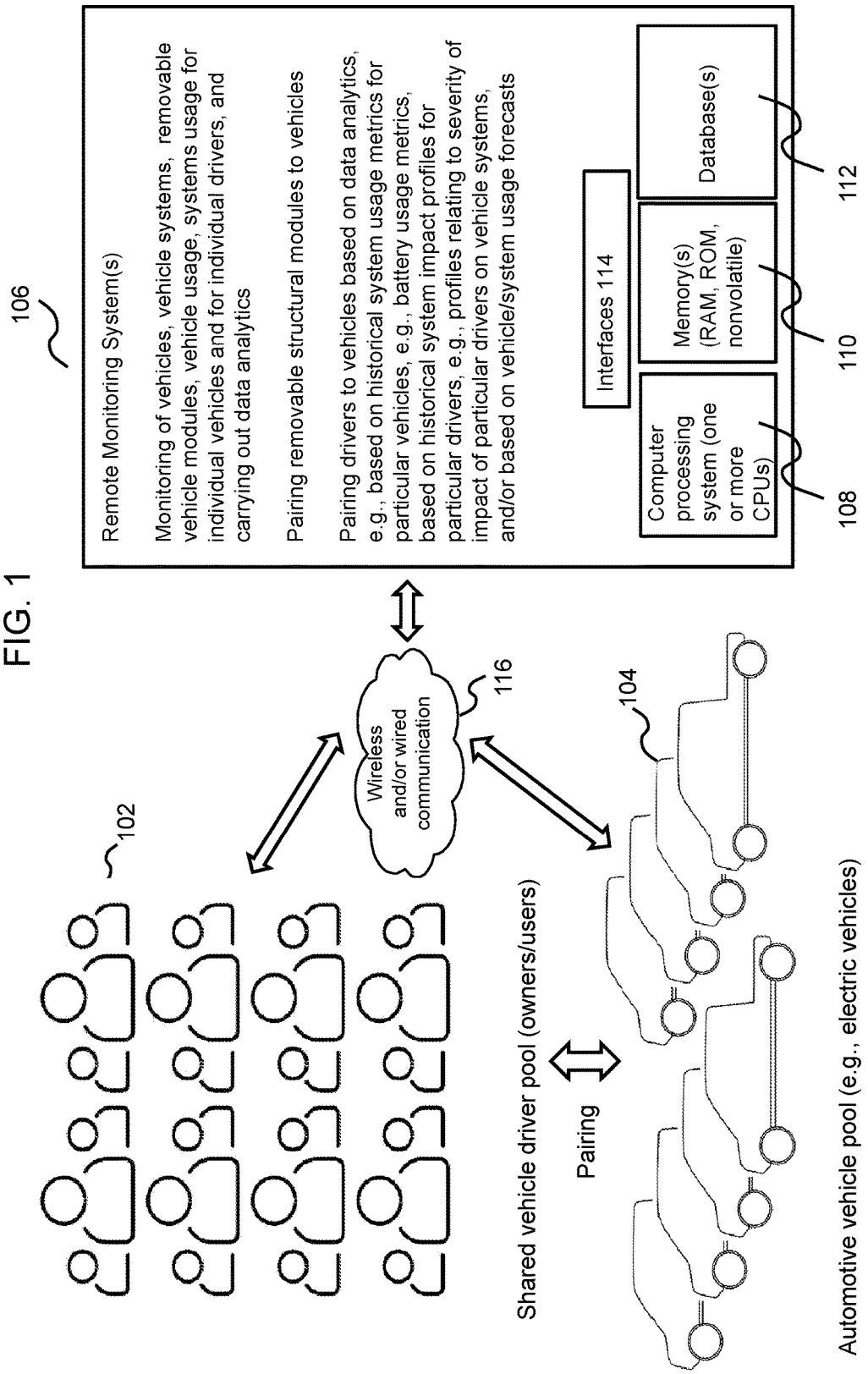

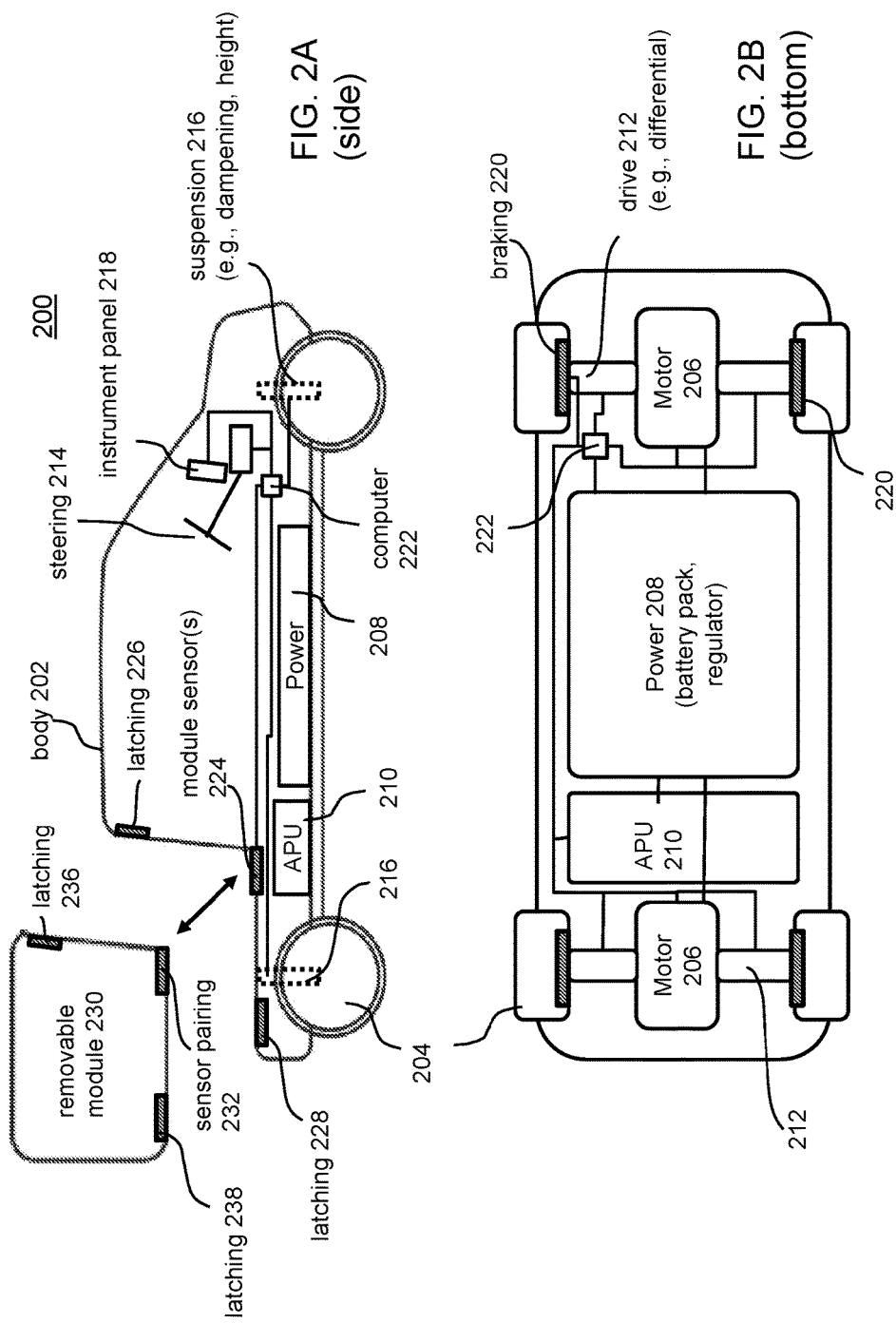

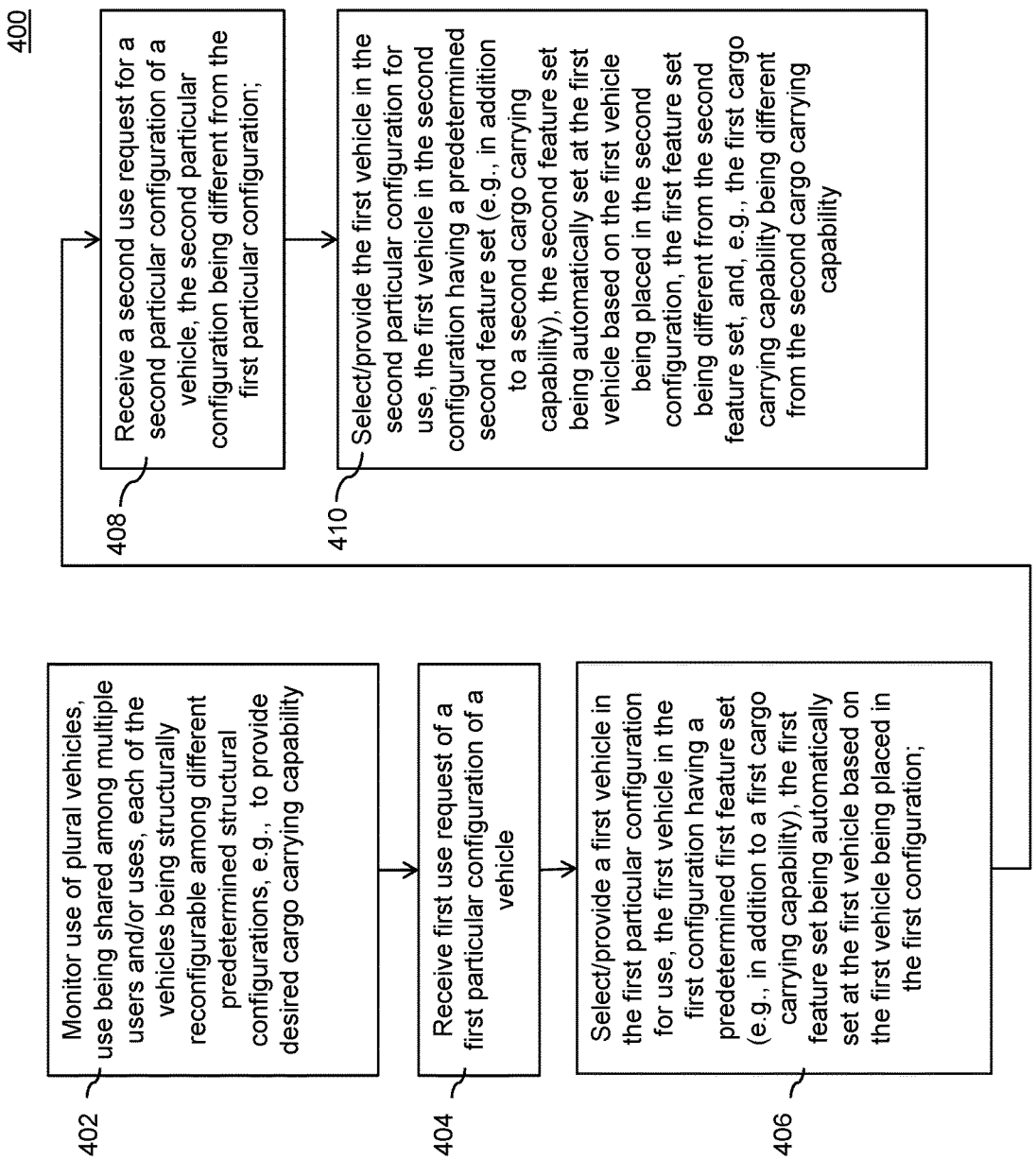

SYSTEMS AND METHODS FOR RECONFIGURABLE ELECTRIC VEHICLES

This application claims the benefit of U.S. Provisional Patent Application No. 62/277,919 filed Jan. 12, 2016 entitled "Systems and Methods for Reconfigurable Electric Vehicles," the entire contents of which are incorporated herein by reference.

BACKGROUND

Field of the Disclosure

The present disclosure relates to vehicles, such as electric vehicles including hybrid vehicles and more particularly to systems and methods for efficient utilization of vehicles such as electric vehicles, including hybrid vehicles.

Background Information

Electric vehicles, including hybrid vehicles, are of great interest for transportation applications and can provide benefits of low or zero emissions, quiet operation, and reduced dependence upon fossil fuels. The present inventor has observed, however, that conventional electric vehicles have relatively low rates of utilization and are structurally and technologically limited in their applicability to different types of uses.

SUMMARY

The present inventor has observed a need for an electric vehicle that can be structurally and reversibly reconfigured for different types of vehicle uses such that, when outfitted with one of multiple predetermined structural configurations, the vehicle detects the particular structural configuration and automatically sets one of multiple predetermined feature sets corresponding to the particular structural configuration. Such feature sets may include for example, certain suspension characteristics appropriate for the particular structural configuration of the vehicle, such as, e.g., particular settings for firmness of ride of the vehicle, braking performance/sensitivity, nominal suspension height, effective steering ratio, etc. The present inventor has determined that such technological enhancements to electric vehicles can provide for enhanced utilization of electric vehicles. Exemplary approaches described herein may address such needs.

According to an example, a structurally reconfigurable automotive vehicle, e.g., an electric vehicle, is described. The automotive vehicle comprises: a body; a motor; a drive system; a battery; a computer system; a first removable structural module selectable from a plurality of predetermined structural modules, the first removable structural module being configured to attach to and be carried by the automotive vehicle via a latching mechanism; and a sensor for detecting the presence of the first removable structural module attached to and carried by the automotive vehicle. The computer system is configured to receive a signal from the sensor identifying the first removable structural module and thereby determine the automotive vehicle to be in a first particular configuration associated with the first removable structural module. The computer system is also configured to automatically set a predetermined feature set for the vehicle based on the first vehicle being placed in the first particular configuration with the first removable structural module.

According to another example, systems and methods for utilization of shared vehicles that are reconfigurable to suit a use request for a particular vehicle configuration are described. An exemplary approach comprises monitoring use of a plurality of vehicles, use of the vehicles being shared among multiple users or uses, each of the vehicles being structurally reconfigurable among different predetermined structural configurations corresponding to a selected predetermined structural configuration; receiving a first use request for use of a first particular configuration of a vehicle; selecting a first vehicle to be provided in the first particular configuration for use, the first vehicle in the first particular configuration having a predetermined first feature set, the first feature set being automatically set at the first vehicle based on the first vehicle being placed in the first particular configuration; receiving a second use request for a second particular configuration of a vehicle, the second particular configuration being different from the first particular configuration; and selecting the first vehicle to be provided in the second particular configuration for use, the first vehicle in the second particular configuration having a predetermined second feature set, the second feature set being automatically set at the first vehicle based on the first vehicle being placed in the second particular configuration, the first feature set being different from the second feature set. A system for carrying out the exemplary approach may comprise a computer processing system and a memory coupled to the computer processing system, wherein the computer processing system is adapted to execute the above-mentioned steps. A non-transitory computer readable medium for carrying out the exemplary approach may comprise program instructions adapted to cause a computer processing system to execute the above-mentioned steps.

According to another example, systems and methods for utilization of shared vehicles that are reconfigurable to suit a use request for a particular vehicle configuration are described. An exemplary approach comprises: monitoring use of a plurality of vehicles, use of the vehicles being shared among multiple users or uses, each of the vehicles being structurally reconfigurable among different predetermined structural configurations corresponding to a selected predetermined structural configuration; receiving a first use request for use of a first particular configuration of a vehicle; selecting a first vehicle having a unique first identification number to be provided in the first particular configuration for use, the first vehicle in the first configuration having a predetermined first feature set, the first feature set being automatically set at the first vehicle based on the first vehicle being placed in the first configuration; receiving a second use request for a vehicle in the first particular configuration; and selecting a second vehicle having a unique second vehicle identification number to be provided in the first particular configuration for use, the second vehicle in the first configuration having a predetermined second feature set, the second feature set being automatically set at the second vehicle based on the second vehicle being placed in the first configuration, the second feature set being the same as the first feature set, the first vehicle and the second vehicle being provided at different times with the same particular removable structural module having a unique module identification number.

BRIEF DESCRIPTION OF THE FIGURES

FIG. 1 illustrates an exemplary framework for an approach of monitoring and managing use of a group of reconfigurable vehicles such as electric vehicles, according to an example of the disclosure.

FIG. 2A illustrates a block diagram in side view of an exemplary reconfigurable electric vehicle according to an example of the disclosure.

FIG. 2B illustrates a block diagram in bottom view of the exemplary reconfigurable electric vehicle of FIG. 2A according to an example of the disclosure.

FIG. 4 illustrates a flow chart of an exemplary approach for utilization of shared vehicles, such as electric vehicles, that are reconfigurable to suit a use request for a particular vehicle configuration according to an example of the disclosure.

DETAILED DESCRIPTION OF EXEMPLARY EMBODIMENTS

Figure 3A:
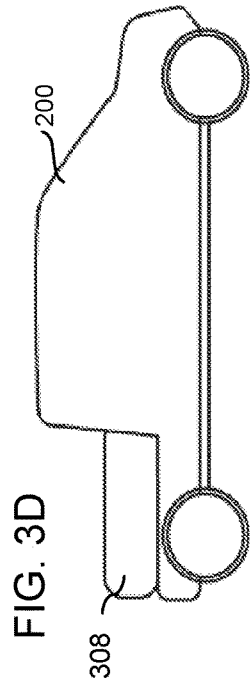
FIGS. 3A-3F illustrate exemplary removable module configurations for vehicles according to examples of the disclosure.

FIG. 1 illustrates an exemplary framework for an approach for a method of monitoring and managing utilization for a group of reconfigurable vehicles, such as electric vehicles including hybrid vehicles. As shown in FIG. 1, a plurality of drivers 102 (or users) of a shared vehicle driver pool, which may comprise both vehicle owners and non-owner users of the vehicles, are to be paired with vehicles, such as electric vehicles, of an automotive vehicle pool 104. In addition, as discussed further herein, removable structural modules such as modules with different cargo carrying capability are also paired with vehicles 104. In examples described herein, major subsystems of the vehicles 104, such as batteries and/or removable structural modules, e.g., with different cargo carrying capability, may be owned by a party or parties who are different than the owners of the vehicles 104 themselves and different from users in the driver pool. A remote monitoring system 106, which may be under the control of a party different than the owners of the vehicles 104, the drivers, and the owners of vehicle major subsystems, may communicate with the vehicles 104 and the users 102 via wireless and/or wired communication including via a network 116 such as the Internet, through smart phones equipped with suitable applications, tablets, and/or desktop or laptop computers. The remote monitoring system 106 may also communicate with on-board computers of the vehicles 104 to control various aspects of vehicle features and performance depending upon predetermined vehicle reconfigurations, as will be described further herein.

The remote monitoring system(s) 106 comprises a computer processing system 108, which may include one or more computer processing units (CPUs) located in one or more computer systems, and one or more memories 110, which may include RAM, ROM, and any suitable nonvolatile memory. The remote monitoring system 106 may also include one or more databases 112 to store data for both vehicles and drivers as will be explained further herein, and one or more interfaces 114 to facilitate communication via networks including the Internet and for facilitating input/output of data. The remote monitoring system 106 carries out monitoring of vehicles, vehicle systems, vehicle usage, and systems usage for individual vehicles and for individual drivers who use those vehicles, and carries out data analytics on the data gathered from the vehicles and the vehicle systems. In examples, the vehicles 104 may include various detectors and sensors for monitoring vehicle dynamics, usage, and demand placed on vehicle systems during the driving of the vehicles 104 by particular drivers 102. For example, the vehicles may include GPS units for monitoring location, speed, and direction, battery monitoring sensors in the form of electrical circuits, for monitoring battery usage, battery discharge as a function of time, and battery charging rates, and other suitable sensors for monitoring the health and status of other major subsystems of the vehicle, such as removable modules as disclosed herein, and for detecting warning or fault conditions. Such data is stored in an onboard computer system with suitable memory and may be uploaded to the remote monitoring system 106 through wireless communication via a vehicle onboard wireless transceiver and/or via wired communication through a vehicle docking station(s) located at the home of a user 102 or other location.

FIG. 2A illustrates a block diagram in side view of an exemplary reconfigurable electric vehicle according to an example of the disclosure, and FIG. 2B illustrates a block diagram in bottom view of the exemplary reconfigurable electric vehicle of FIG. 2A. As shown in FIGS. 2A and 2B, a vehicle 200 such as an electric vehicle, which can be a hybrid vehicle, includes a body 202, wheels/tires 204, one or more motors 206, and a power system 208 including a battery pack and a power regulator system. The motor(s) 206 and power system 208 may be monitored and controlled by an onboard computer 222 via suitable electrical interfaces. The vehicle may also include an auxiliary power unit (APU) 210, which may also be monitored and controlled by the onboard computer 222, and may be in the form of, e.g., a gasoline, propane, alcohol or other fuel-driven electric generator that provides auxiliary power to the power system 208 for driving motor(s) 206. In examples, an APU 210 may be considered a removable structural module in the present disclosure. The vehicle 200 may also include a drive system 212 that couples rotational motion from the motor(s) 206 to the wheels 204 and that may be monitored and controlled by the onboard computer 222. In some examples, each wheel 204 may be driven by its own motor 206, in which case a drive system 212 may provide a suitable coupling to provide rotation motion from the motor 206 to the wheel 204. In other examples, a motor 206 may drive more than one wheel 204, in which case the drive system 212 may provide suitable coupling for providing rotational motion from the motor 206 to the wheels 204, such as through a suitable differential.

The vehicle 200 also includes a steering system 214, to provide, e.g., electrical steering, hydraulic steering, or combination thereof, which may also be monitored and controlled by the onboard computer 222. The vehicle 200 also includes suspension components 216, e.g., air actuated vehicle leveling and shock absorbers for adjusting ride height and ride dampening. The vehicle 200 also includes one or more instrument panels 218, e.g., in the form of flat panel, e.g., liquid crystal, electroluminescent, etc., displays, which may be monitored and controlled by the onboard computer 222. The vehicle also includes braking components 220, e.g., disks and/or regenerative braking assemblies that may be monitored and controlled by computer system 222.

The vehicle 200 also includes one or more module sensors 224 for detecting the presence of a removable structural module 230 as well as one or more latching mechanisms 226, 228 for securing the module 230 to the vehicle 200 via respective latching mechanisms 236, 238 on the module 230. Such latching mechanisms may include simple fasteners such as bolts, or may include other suitable mechanisms such as over-center latches with locks, tab-in-slot latching mechanisms (e.g., similar to seat belt/safety belt locking mechanisms), and electromechanical automatic cinching latches such as commonly used on vehicle door locks and made of suitable strength/gauge materials to accommodate the weight and loads associated with expected vehicle uses and potential impacts. As described herein, multiple different types of removable structural modules 230 may be utilized with a vehicle 200. In examples, the module sensor(s) 224 may detect the presence of a particular type of module 230 or a unique module 230 of a particular type that has a unique identification number distinguishing it from other modules of any type. For example, the module sensor(s) 224 may detect a sensor pairing device 232 on the module 230, e.g., an electronic chip, a radio frequency identification (RFID) chip, a magnet structure of a particular configuration, etc., that permit the sensor(s) 224 to capture or generate a signal that permits the onboard computer 222 to determine the type and/or identification of a given removable module 230. In another example, the sensor pairing device 232 and the sensor(s) 224 may comprise Bluetooth transceivers or other wireless devices that establish communication so as to permit the sensor(s) 224 (e.g., Bluetooth transceiver) to receive or generate a signal that permits the onboard computer 222 to determine the type and/or identification of a given removable module 230. In addition, wireless transceivers disposed at (e.g., in or on or integrated into) the removable structural module 230 may pair and communicate not only with the onboard computer 222, but also with mobile computing devices such as smart phones, tablets, and other portable computerized devices, to provide diagnostics (e.g., verification of secure attachment, verification that access ports are secured and locked, etc.), information about the removable module 230 itself (e.g., environmental information such as internal temperature and humidity), information about the contents or loading of the removable structural module (e.g., identification of which packages remain in the module for delivery based on package sensors such as RFID sensors in the module 230, identification of any problematic load shifting based on a distribution, e.g., an array of load sensors integrated into support surfaces of the module 230), or other information such as imagery taken within or at the module 230 (e.g., to verify integrity of a load). In examples, power may be provided to the module 230 via interfaces between sensor(s) 224 and sensor pairing devices 232 and/or via suitable electrical interfaces and connectors located at, e.g., integrated into, the latching mechanisms 226, 228 and 236, 238.

Figure 3B:
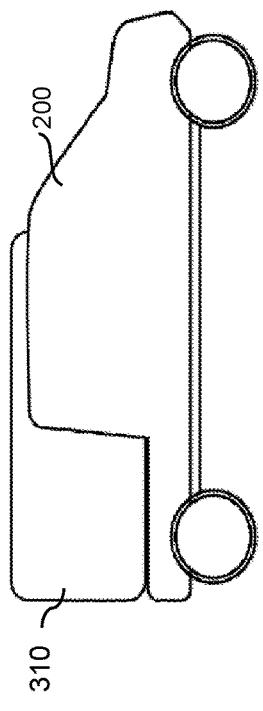
Figure 3C:
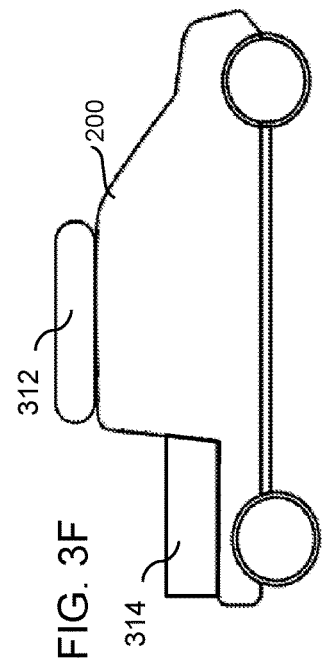
Figure 3D:
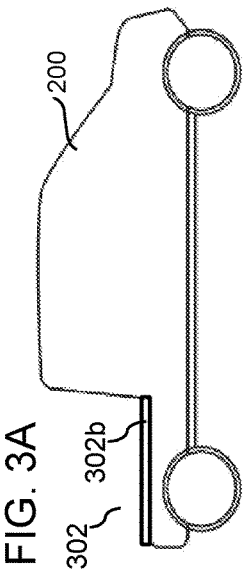
Figure 3E:
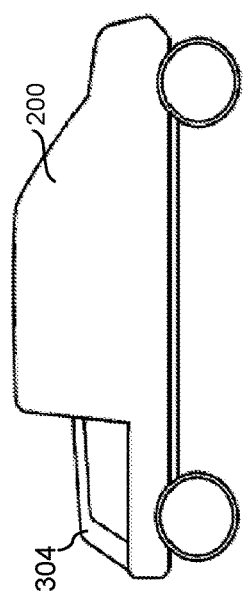
Figure 3F:
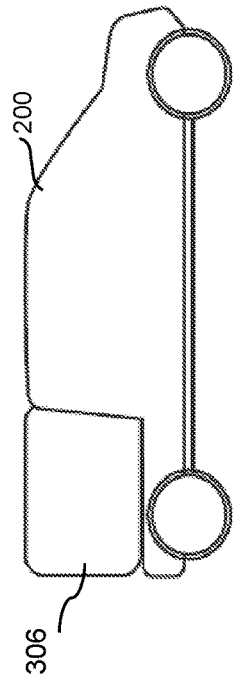

FIGS. 3A-3F illustrate exemplary removable and interchangeable modules that permit desired reconfiguration of a given vehicle 200 in a pool of vehicles to suit desired uses and needs. It will be appreciated that the examples illustrated in FIGS. 3A-3F are merely exemplary and not exhaustive, and that each of the examples may be paired with a vehicle 200 such as illustrated in FIGS. 2A and 2B, along with associated latching (securing) of the module to vehicle 200, sensing of the type and/or unique identification of the module, communication between the vehicle 200 and the module, power delivery to the module, or combination thereof. FIG. 3A illustrates an exemplary baseline or naked configuration 302 with either no removable module attached to the vehicle 200 or with a removable protective base insert 302b, which may be used with or without additional modules, e.g., to protect the underlying vehicle support surface from wear and tear associated with repeated removal and installation of different modules. FIG. 3B illustrates an exemplary removable side rail module 304, wherein side rails 304 may be inserted into receiving holes at the vehicle 200. FIG. 3C illustrates an exemplary removable roof-height enclosed module 306 (whose height is approximately that of the height of the roof of the vehicle 200), e.g., suitable for delivery applications. FIG. 3D illustrates an exemplary removable below-roof-height enclosed module 308, e.g., suitable for everyday cargo carrying needs for a typical user, and which provides good visibility through the rear window of the vehicle 200 and minimal blind spots. FIG. 3E illustrates an exemplary removable over-the-vehicle-roof recreational module 310 that may include a pop-up roof and is configured for camping. FIG. 3F illustrates an exemplary removable roof module 312 for cargo carrying at the roof of vehicle 200 and an exemplary removable open box module 314 for utility use, e.g., for hauling desired items such as refuse, appliances, building materials, etc. The modules 312 and 314 illustrated in FIG. 3F need not be used together and may be used separately. More generally, as illustrated in FIG. 3F more than one module may be configured and attached to a given vehicle 200 at one time. In the examples illustrated in FIGS. 2A-2B and 3A-3F, it can be observed that the removable structural modules of these examples are not trailers that are towed behind a vehicle but rather are removable modules that are releasably attached/secured to and supported by the vehicle 200 itself using a releasable attachment in a releasable manner, e.g., such that when the module 230 is attached/secured so as to be transported by the moving vehicle 200 (i.e., during driving), the weight of the removable structural module 230 is fully supported by the vehicle 200. Exemplary cargo carrying capacities for exemplary structural modules 230 may range from, e.g., about 30-120 cubic feet including but not limited to, for instance, about 30-50 cubic feet, about 50-70 cubic feet, about 70-90 cubic feet, about 80-100 cubic feet, about 100-120 cubic feet, and the like.

FIG. 4 illustrates a flow chart of an exemplary approach for utilization of shared vehicles such as electric vehicles that are reconfigurable to suit a use request for a particular vehicle configuration according to examples of the disclosure. The steps need not be carried out in the specific order illustrated in FIG. 4. As shown at step 402, use of a plurality of vehicles 104, 200, such as electric vehicles, is monitored, e.g., with a computer system, such as system 106 shown in FIG. 1. Use of the vehicles 104, 200 is shared among multiple users, and each of the vehicles 104, 200 is structurally reconfigurable among different predetermined structural configurations, e.g., to provide a desired cargo carrying capability corresponding to a selected predetermined structural configuration, such as the exemplary configurations illustrated in FIGS. 3A-3F. At step 404, a first use request, e.g., from a first user, is received, e.g., by computer system 106 under control of an entity responsible for vehicle monitoring and fulfilling use requests, for use of a first particular configuration of a vehicle. At step 406, a first vehicle, e.g., with a unique vehicle identification number (VIN), having been placed in the first particular configuration, is provided for the requested use, e.g., to the first user. The first vehicle in the first configuration has a predetermined first feature set, e.g., in addition to a first cargo carrying capability, and the first feature set is automatically set at the first vehicle, e.g., by the onboard computer system 222, based on the first vehicle being placed in the first configuration. The onboard computer 222 may select the first feature set based on detection of a particular type and/or unique identification of removable structural module. The entity that monitors vehicle use and receives use requests may maintain an inventory of both vehicles 104, 200 and removable structural modules 230 of different types so as to fulfill the particular requests.

At step 408, a second use request, e.g., from a second user, is received, e.g., by computer system 106 under control of an entity responsible for vehicle monitoring and fulfilling use requests, for a second particular configuration of a vehicle, where the second particular configuration is different from the first particular configuration. At step 410, the first vehicle, e.g., the same vehicle with the same unique VIN as referred to above, having been placed in the second particular configuration, is provided for use, e.g., to the second user. The first vehicle in the second configuration has a predetermined second feature set, e.g., in addition to a second cargo carrying capability, and the second feature set, e.g., by the onboard computer system 222, is automatically set at the first vehicle based on the first vehicle being placed in the second configuration. The onboard computer 222 may select the first feature set based on detection of a particular type and/or unique identification of removable structural module. In this example, the first feature set is different from the second feature set, and the first cargo carrying capability is different from the second cargo carrying capability. Accordingly, the same vehicle, with a unique VIN, may be provided for multiple different uses, e.g., to multiple different users, in multiple different configurations associated with different removable structural modules. As noted above, the first use request may be received from a first user and the second use request may be received from a second user. But the first use request and the second use request may also be received from the same user, e.g., at different times.

The monitoring mentioned above may be carried out by an entity other than owners of said vehicles and other than users of the vehicles. Moreover, the users of the vehicles need not be owners of vehicles of themselves. Rather, they may be subscribers to a vehicle sharing framework as disclosed herein, and may pay for vehicle usage based on requested vehicle configuration, mileage and duration of use, or combination thereof. The monitoring entity may collect use fees for vehicle use, e.g., from users, and may compensate an owner of a given vehicle for use by others.

As illustrated in the examples of FIGS. 2A-2B and 3A-3F, the different predetermined structural configurations of the vehicles may be provided by different, removable structural modules, e.g., removable cargo modules. Such modules may include, for example, a removable recreation module, a removable delivery module, a removable open box utility module, a removable flatbed support module, and a removable side rail module. In addition, any of such modules may further include additional storage compartments and suitable attachment structures such as tie down hardware.

In examples, the first predetermined feature set and/or the second predetermined feature set can be automatically set at the first vehicle by the onboard computer 222 of the vehicle 200 based on an identification of the first particular configuration with a sensor system, e.g., 224, 232, that automatically generates a signal indicative of the particular vehicle configuration associated with a given attached structural module. In another example, the first predetermined feature set and/or the second predetermined feature set may be automatically set at the first vehicle by the onboard computer 222 of the vehicle 200 based on an identification of the first particular configuration through communication between the first vehicle and at least one of multiple removable modules 230, e.g., such as through communication of paired Bluetooth or other wireless transceivers at the removable module 230 and the vehicle 200.

In examples, the first predetermined feature set and the second predetermined feature set may comprise one or more ride performance characteristics including one or more of a limitation on a maximum permissible acceleration, a firmness of ride of the vehicle, braking performance/sensitivity, a nominal suspension height, and an effective steering ratio. In this regard, after the onboard computer 222 identifies the type and/or unique identification of the particular configuration, e.g., module 230 (or the configuration, e.g., module, transmits its type to the onboard computer 222), the onboard computer 222 may choose appropriate vehicle driving performance characteristics suitable for the configuration and vehicle use. For example, if the module 230 attached to the vehicle is a delivery module, the onboard computer 222 may limit the acceleration of the vehicle 200 so as to avoid damaging merchandise in the delivery module, soften the ride by adjusting a suspension component 216, and provide normal braking performance and sensitivity and normal steering performance and sensitivity. In another example, where the particular configuration involves attachment of a recreational module for camping, vehicle performance characteristics may be altered in a predetermined way to account for the higher center of gravity of such a removable module, e.g., to place limits on speed, acceleration, etc. Onboard GPS may also monitor the location of the vehicle such that when the vehicle is determined by the onboard computer 222 to be in off-road conditions, the onboard computer 222 may adjust vehicle suspension components 216 to raise the vehicle height to facilitate avoidance of obstructions such as rocks, pot holes, etc. In an example of a naked configuration, and if a particular user's historical usage reflects performance driving habits, the vehicle driving characteristics may be automatically set by the onboard computer 222 to provide for sport performance and handling, e.g., permissible high acceleration, quick steering response, quick braking response, etc. Of course, other traditional aspects of vehicle stability control and traction control may additionally operate in all such instances described above.

In examples, the first predetermined feature set and/or the second predetermined feature set may also comprise one or more human-machine interface (HMI) elements at the instrument panel(s) 218 including one or more adaptive display elements, one or more graphical user interface elements, and one or more audio rendering elements. In other words, interior features may be adjusted as well as driving performance or other characteristics. For example, for a delivery application, the delivery itinerary may be uploaded to the vehicle computer 222, in which case the first predetermined feature set may also comprise display functionality displayed at the instruction panel(s) 218 to reflect the status of deliveries, traffic routes/directions to facilitate delivery in high traffic contexts, wherein such functionality would not be displayed for other types of configurations associated with different types of modules. In another example, where the identified configuration, e.g., removable module, is that of a recreational camping module, HMI elements of weather alerts or imagery from exterior cameras in an off-road scenario may be displayed for safety concerns, as well as alert notifications from obstacle detection using suitable object detection sensors placed at suitable sensitivity for off-road use. In another example, a predetermined feature set may include automatically set vehicle interior lighting durations upon vehicle entry and environmental heating protocols based on particular vehicle configurations, e.g., such as in a delivery configuration to provide a comfortable cockpit for delivery drivers who repeatedly exit and reenter the vehicle, such as rapid, high-power heating upon vehicle reentry.

As noted above, in examples, a wireless signal comprising use-dependent information may be communicated to the first vehicle in the first particular configuration based on an expected use of the first vehicle in the first particular configuration and/or based upon particular use information provided with the use requested for the vehicle.

In examples, the monitoring system 106 may calculate metrics of driver impact on vehicles for individual drivers 102 who share usage of the pool of vehicles 104, 200. Drivers who drive vehicles vigorously, with rapid acceleration and rapid deceleration, may be rated with metrics reflecting a greater level of severity and demand placed upon vehicles. Drivers who drive vehicles gently, with relatively slow acceleration and slow deceleration, may be rated with metrics reflecting a lesser level of severity and demand placed vehicles. In order to average out the demand over time placed upon vehicles 104, 200, the remote monitoring system 106 may select and pair a driver 102 with a particular vehicle 104, 200 based upon historical usage and driving severity metrics for a given vehicle 104, 200 and based on driver impact metrics for the pool of drivers 102. For example, the remote monitoring system may determine for a particular vehicle 104, 200 that the vehicle 104, 200 has been driven with a relatively severe impact by recent users of the vehicle 104, 200. In such an instance the remote monitoring system 106 may pair a driver 102 who characteristically drives vehicles relatively gently in an effort to achieve a more balanced usage of the particular vehicle 104, 200 over time. The remote monitoring system may also pair different types of removable structural modules 230 with particular vehicles so that a particular vehicle 104, 200 is not overly paired with delivery modules or utility modules which may coincide with more severe use of the vehicle 104, 200.

For example, the remote monitoring system may access previously calculated metrics stored in a database 112 associated with the historical usage of the particular vehicle 104, 200 with different types of removable modules 230. Based on those metrics for the multiple drivers 102 and prior use of particular types of configurations, e.g., modules 230, for that vehicle 104, 200, the remote monitoring system may select a particular driver 102 to be paired with a particular vehicle 104, 200 and/or may select a particular type of module 230 to be paired with a particular vehicle 104, 200, to reduce the overall severity of use placed upon that particular vehicle 104, 200 so as to achieve better balance in severity of usage for a particular vehicle 104, 200 and enhanced life and performance of the particular vehicle 104, 200. Of course, the remote monitoring system 106 may carry out these types of analyses continually or at specified intervals for all of the vehicles 104, 200 and all of the users 102 so as to continually pair particular drivers 102 and/or particular types of modules 230 with particular vehicles 104, 200 based on the most updated data in an effort to achieve a desirable balance of vehicle usage for all of the vehicles 104, 200. In addition, the remote monitoring system 106 continually updates the database 112 with the most recent vehicle system usage data and driver impact data collected from sensors at the vehicles 104, and also updates the associated vehicle system usage metrics and driver impact metrics, which may change with time, at the database 112.

The framework of pairing a pool of drivers 102 with a pool of vehicles 104, e.g., electric vehicles, any of which may be reconfigured with removable structural modules 230, such as for cargo carrying capability, can enhance utilization of electric vehicles in a manner that is cost-efficient for the users 102, or the uses 502, of which only some or possibly none may themselves be owners of the vehicles 104. To further reduce initial capital costs to owners of the vehicles 104, removable structural modules 230 may be owned by one or more parties who are themselves not owners of the vehicles 104, 200 and who may be the same as or different from the entity that controls the remote monitoring system 106. Such a frame is beneficial for vehicle owners, since they need not invest in the capital expenditure of multiple modules, but nonetheless may gain the benefit, as non-owner users may, of use of multiple modules through payment of suitable use fees for such modules based on mileage, time duration, type of module, or combination thereof. Entities that own modules bear the initial capital cost of such but reap usage fees from the pool of users 102.

Figure 5:
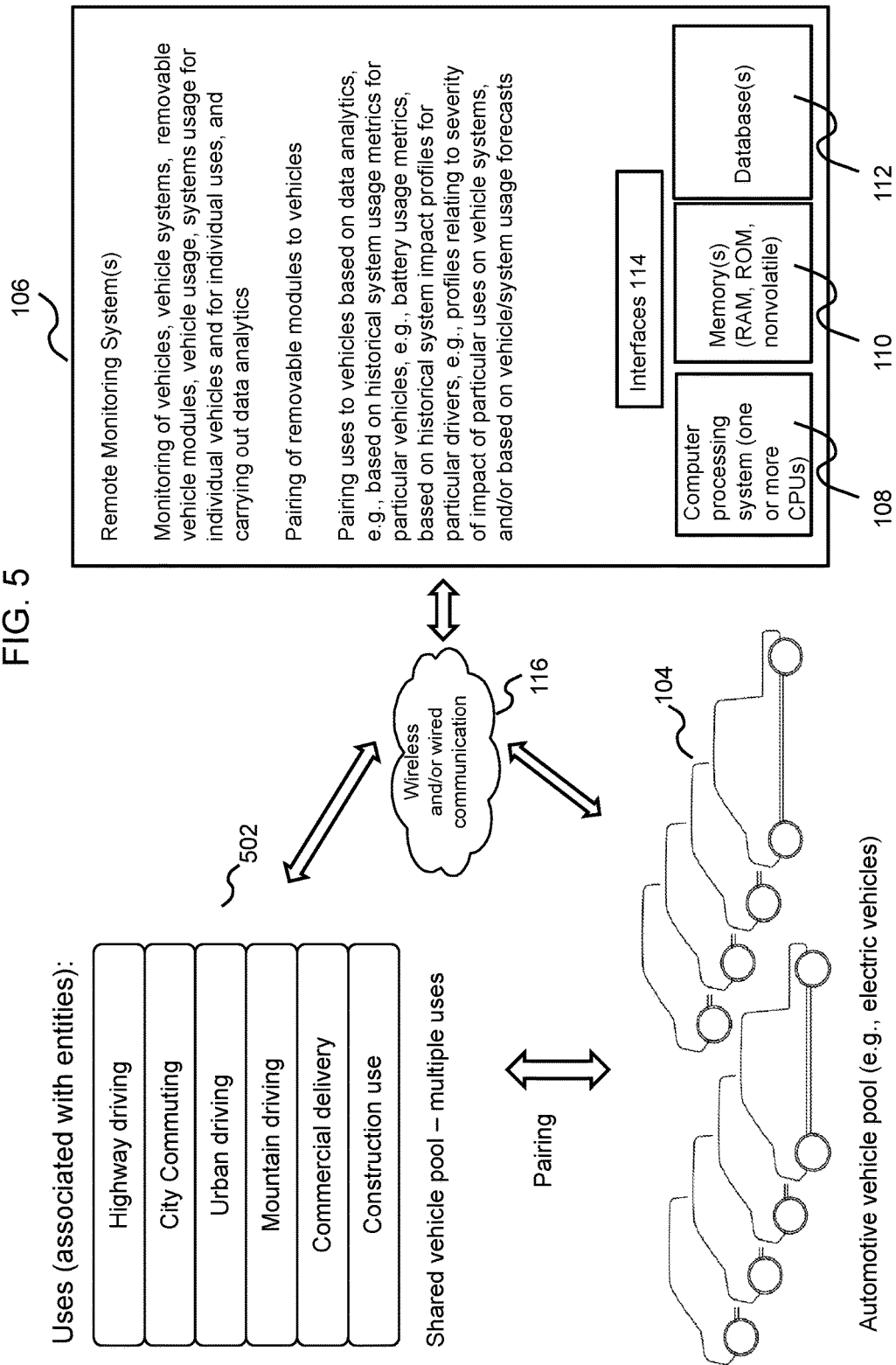
FIG. 5 illustrates another exemplary framework for an approach of monitoring and managing use of a group of reconfigurable vehicles such as electric vehicles, according to an example of the disclosure.

FIG. 5 illustrates another exemplary framework for an approach for a method of monitoring and enhancing battery utilization for a group of vehicles, such as electric vehicles including hybrid vehicles. This example is similar to the example of FIG. 1, except that in the example of FIG. 5, particular uses 502 are being paired to particular vehicles 104, 200 of a shared-vehicle pool, instead of pairing particular users 102 to particular vehicles 104, 200. In other respects, FIG. 5 is like FIG. 1, and where applicable, the same reference numerals as in FIG. 1 have been retained for FIG. 5. This example may be implemented, for instance, for a pool of autonomously driven electric vehicles 104, 200 i.e., vehicles 104, 200 driven without human drivers. In other respects, the prior discussion relating FIGS. 2-4 is equally applicable to the example of FIG. 5. As shown in FIG. 5, a plurality of uses 502 of a shared-vehicle pool for multiple particular uses are to be paired with vehicles, such as electric vehicles 104, 200 of a vehicle pool. In examples described herein, major subsystems of the vehicles 104, 200 such as batteries and/or removable structural modules 230, e.g., of certain cargo carrying capability, may be owned by an entity or entities that are different than the owners of the vehicles 104 themselves. A remote monitoring system 106 under the control of an entity different than the owners of the vehicles 104, 200 communicates with the vehicles 104, 200 and may communicate with entities who control the uses 502 via wireless and/or wired communication including via a network 116 such as the Internet, through smart phones equipped with suitable applications, tablets, and/or desktop or laptop computers.

The remote monitoring system(s) 106 is like that described for FIG. 1, and the vehicles 104, 200 may include a host of sensors which communicate data to and may receive communication from the system 106, such as discussed above in connection with FIG. 1. The remote monitoring system 106 carries out monitoring of vehicles, vehicle systems, vehicle usage, and systems usage for individual vehicles and for individual uses specified by entities who control those uses, and carries out data analytics on the data gathered from the vehicles and the vehicle systems. The remote monitoring system 106 (via processing by the computer processing system 118) also responds to requests for particular configurations of vehicles and provides vehicles in requested configurations, e.g., configured with requested types of removable structural modules, such as illustrated in the examples of FIGS. 2A-2B and 3A-3F. The specification of an intended use by an entity that is a repeat customer permits the monitoring system 106 to predict a same future intended use for a vehicle when a vehicle is requested by that entity, and this prediction assists the monitoring system to carry intelligent pairing of vehicles to uses to spread, or average out, the severity of vehicle use across the pool of vehicles 104 so as to avoid concentrating severe uses on just certain particular vehicles. In examples, the vehicles 104 may include various detectors and sensors for monitoring vehicle dynamics and usage and demand placed on vehicle systems during the use of the vehicles 104, 200 by particular uses 502. For example, the vehicles may include units for monitoring location, speed, and direction, battery monitoring sensors in the form of electrical circuits for monitoring battery usage, battery discharge as a function of time, and battery charging rates, and other suitable sensors for monitoring the health and status of other major systems of the vehicle and for detecting warning or fault conditions. Such data is stored in an onboard computer system with suitable memory and may be uploaded to the remote monitoring system 106 through wireless communication via a vehicle onboard wireless transceiver and/or via wired communication through a vehicle docking station(s) located at a specified location. Moreover, the utilization of GPS sensors and battery monitoring sensors (e.g., discharge monitoring circuits), permits the monitoring system to itself determine uses, e.g., through real-time access of maps from database 112, and through analysis of speed and other data to analyze the type of driving that is being incurred at a specific time for a specific vehicle.

The remote monitoring system 106 may calculate metrics of use impact on various vehicle systems, such as the vehicle battery, and severity of use, for individual uses 502 that share usage of the pool of vehicles 104, 200 like that discussed above for particular users. The computer monitoring system 106 may utilize such metrics and data to mitigate the severity of use on any given vehicle 104, 200 such as described above. For example, the remote monitoring system may access previously calculated metrics stored in a database 112 associated with the historical vehicle usage, including usage in particular configurations associated with different types of removable structural modules, and based on such, may select a particular use 502 to be paired with a particular vehicle 104 to mitigate overall severity of use of that particular vehicle 104, 200. Of course, the remote monitoring system 106 may carry out these types of analyses continually or at specified time intervals for all of the vehicles 104, 200 and all of the uses 502 so as to continually pair particular uses 502, including uses associated with particular requested vehicle configurations associated with a requested type of removable structural module 230, with particular vehicles 104, 200 based on the most updated data in an effort to achieve a desirable balance of vehicle usage for all of the vehicles 104, 200. In addition, the remote monitoring system 106 continually updates the database 112 with the most recent vehicle system usage data and use impact data collected from sensors at the vehicles 104, 200 and also updates the associated vehicle system usage metrics and use impact metrics, which may change with time, at the database 112.

As discussed above described approaches may have benefits over conventional approaches for utilization of batteries for electric vehicles, including better utilization of electric vehicles, lower costs of ownership and driving for owners and/or users of the electric vehicles, greater variability and flexibility in the types of uses available to drivers and other customers, improved vehicle life, and improved vehicle integrity and reliability over the life of the vehicle.

The methods and systems described herein may be implemented using any suitable computer processing system with any suitable combination of hardware, software and/or firmware. As shown in FIGS. 1 and 5, users 102, entities that control uses 502, and vehicles 104 can interact with remote monitoring system 106 hosted on one or more computer servers through a network 116. The computer processing system 108 may execute software operations, program instructions or routines to implement calculations and analyses described above. Such program instructions, accumulated data, and processed data may be stored one or more non-transitory computer-readable memories 110 and/or one or more data stores for in databases 112. Communications may be carried out according to a client server architecture whereby users 102 and vehicles 104 may access the monitoring system 106 via one or more servers via one or more networks 116.

The systems may include element managers, real-time data buffers, conveyors, file input processors, database indices, data buffers and data managers for managing data and processing. The system 106 may also include multiple displays, display interfaces, input/output devices such as a keyboards, microphones, mice, touch screens and the like for permitting administrators or support personnel to manage the system 106.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. In addition, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated.

While the present invention has been described in terms of exemplary embodiments, it will be understood by those skilled in the art that various modifications can be made thereto without departing from the scope of the invention as set forth in the claims.

What is claimed is:

1. A method of utilization of shared vehicles that are reconfigurable to suit a use request for a particular vehicle configuration, the method comprising:
   monitoring use of a plurality of vehicles, use of the vehicles being shared among multiple users or uses, each of the vehicles being structurally reconfigurable among different predetermined structural configurations and configurable in a selected predetermined structural configuration, the different predetermined structural configurations being provided by different, removable structural modules configured to be removably attached to an exterior of the vehicle;
   receiving a first use request for use of a first particular configuration of a vehicle;
   selecting a first vehicle to be provided in the first particular configuration for use, the first vehicle in the first particular configuration including a first removable structural module attached to an exterior of the first vehicle, a first feature set affecting operation of the first vehicle being automatically set at the first vehicle based on the first vehicle having the first particular configuration with the first removable structural module attached to the exterior of the first vehicle;
   receiving a second use request for a second particular configuration of a vehicle, the second particular configuration being different from the first particular configuration; and
   selecting the first vehicle to be provided in the second particular configuration for use, the first vehicle in the second particular configuration including a second removable structural module attached to the exterior of the first vehicle, the second removable structural module having a structure different than that of the first removable structural module, a second feature set affecting operation of the first vehicle being automatically set at the first vehicle based on the first vehicle having the second particular configuration, the first feature set being different from the second feature set with the second removable structural module attached to the exterior of the first vehicle.

2. The method of claim 1, wherein the first use request is received from a first user and the second use request is received from a second user.

3. The method of claim 1, wherein the first use request and the second use request are received from a first user.

4. The method of claim 1, wherein the first vehicle has a unique vehicle identification number regardless of configuration of the first vehicle.

5. The method of claim 1, wherein said monitoring is carried out by an entity other than owners of said vehicles and users of said vehicles.

6. The method of claim 5, wherein said entity collects use fees for vehicle use and compensates an owner of a given vehicle for use by others.

7. The method of claim 1, wherein said different removable structural modules include: a removable recreation module; a removable delivery module; a removable open box utility module; a removable flat bed support module; and a removable side rail module.

8. The method of claim 1, wherein at least one of the first predetermined feature set and the second predetermined feature set are automatically set at the first vehicle by an onboard computer of the vehicle based on an identification of the first particular configuration with a sensor system that automatically generates a signal indicative of vehicle configuration.

9. The method of claim 1, wherein at least one of the first predetermined feature set and the second predetermined feature set are automatically set at the first vehicle by an onboard computer of the vehicle based on an identification of the first particular configuration through communication between the first vehicle and at least one of multiple removable structural modules.

10. The method of claim 1, wherein the first predetermined feature set and the second predetermined feature set comprise one or more ride performance characteristics including one or more of a limitation on a maximum permissible acceleration, a firmness of ride of the vehicle, braking performance/sensitivity, a nominal suspension height, and an effective steering ratio.

11. The method of claim 1, wherein at least one of the first predetermined feature set and the second predetermined feature set comprises one or more human-machine interface elements at an instrument panel including one or more adaptive display elements, one or more graphical user interface elements, and one or more audio rendering elements.

12. The method of claim 1, comprising communicating a wireless signal comprising use-related or configuration-related information to the onboard computer or a mobile computing device for the first vehicle in the first particular configuration based on expected use or actual use of the first vehicle in the first particular configuration.

13. The method of claim 1, wherein the first vehicle in the first particular configuration has a first cargo carrying capability in addition to the predetermined first feature set, and wherein the first vehicle in the second particular configuration has a second cargo carrying capability in addition to the predetermined second feature set, the first cargo carrying capability being different from the second cargo carrying capability.

14. The method of claim 1, wherein the first particular configuration of the first vehicle is attained with providing a first removable structural module having a first cargo carrying capability for the first vehicle having a first unique vehicle identification number.

15. The method of claim 14, wherein the first removable structural module has a first unique module identification number.

16. The method of claim 15, comprising:
receiving a third use request for a vehicle in the first particular configuration; and
selecting a second vehicle with a second unique vehicle identification number different from the first unique vehicle identification number to be provided with the first removable structural module having the first unique module identification number,
the second vehicle with the second unique vehicle identification number together with the first removable structural module having the first unique module identification number together providing the first particular configuration.

17. A non-transitory computer readable medium comprising program instructions for facilitating utilization of shared vehicles that are reconfigurable to suit a use request for a particular vehicle configuration, the program instructions when executed adapted to cause a computer processing system to:
monitor use of a plurality of vehicles, use of the vehicles being shared among multiple users or uses, each of the vehicles being structurally reconfigurable among different predetermined structural configurations and configurable in a selected predetermined structural configuration, the different predetermined structural configurations being provided by different, removable structural modules configured to be removably attached to an exterior of the vehicle;
receive a first use request for use of a first particular configuration of a vehicle;
select a first vehicle to be provided in the first particular configuration for use, the first vehicle in the first particular configuration including a first removable structural module attached to an exterior of the first vehicle, a first feature set affecting operation of the first vehicle being automatically set at the first vehicle based on the first vehicle having the first particular configuration with the first removable structural module attached to the exterior of the first vehicle;
receive a second use request for a second particular configuration of a vehicle, the second particular configuration being different from the first particular configuration; and
select the first vehicle to be provided in the second particular configuration for use, the first vehicle in the second particular configuration including a second removable structural module attached to the exterior of the first vehicle, the second removable structural module having a structure different than that of the first removable structural module, a second feature set affecting operation of the first vehicle being automatically set at the first vehicle based on the first vehicle having the second particular configuration, the first feature set being different from the second feature set with the second removable structural module attached to the exterior of the first vehicle.

18. A system for utilization of shared vehicles that are reconfigurable to suit a use request for a particular vehicle configuration, the system comprising:
a computer processing system; and
a memory coupled to the computer processing system, wherein the computer processing system is adapted to:
monitor use of a plurality of vehicles, use of the vehicles being shared among multiple users or uses, each of the vehicles being structurally reconfigurable among different predetermined structural configurations and configurable in a selected predetermined structural configuration, the different predetermined structural configurations being provided by different, removable structural modules configured to be removably attached to an exterior of the vehicle;
receive a first use request for use of a first particular configuration of a vehicle;
select a first vehicle to be provided in the first particular configuration for use, the first vehicle in the first particular configuration including a first removable structural module attached to an exterior of the first vehicle, a first feature set affecting operation of the first vehicle being automatically set at the first vehicle based on the first vehicle having the first particular configuration with the first removable structural module attached to the exterior of the first vehicle;
receive a second use request for a second particular configuration of a vehicle, the second particular configuration being different from the first particular configuration; and
select the first vehicle to be provided in the second particular configuration for use, the first vehicle in the second particular configuration including a second removable structural module attached to the exterior of the first vehicle, the second removable structural module having a structure different than that of the first removable structural module, a second feature set affecting operation of the first vehicle being automatically set at the first vehicle based on the first vehicle having the second particular configuration, the first feature set being different from the second feature set with the second removable structural module attached to the exterior of the first vehicle.

19. A method of utilization of shared vehicles that are reconfigurable to suit a use request for a particular vehicle configuration, the method comprising:
monitoring use of a plurality of vehicles, use of the vehicles being shared among multiple users or uses, each of the vehicles being structurally reconfigurable among different predetermined structural configurations corresponding to a selected predetermined structural configuration;
receiving a first use request for use of a first particular configuration of a vehicle;
selecting a first vehicle having a unique first identification number to be provided in the first particular configuration for use, the first vehicle in the first configuration having a predetermined first feature set, the first feature set being automatically set at the first vehicle based on the first vehicle being placed in the first configuration;
receiving a second use request for a vehicle in the first particular configuration; and
selecting a second vehicle having a unique second vehicle identification number to be provided in the first particular configuration for use, the second vehicle in the first configuration having a predetermined second feature set, the second feature set being automatically set at the second vehicle based on the second vehicle being placed in the first configuration, the second feature set being the same as the first feature set,
the first vehicle and the second vehicle being provided at different times with a same particular removable structural module having a unique module identification number.

20. A structurally reconfigurable automotive vehicle, comprising:
a body;
a motor;
a drive system;
a battery system;
a computer system;
a first removable structural module selectable from a plurality of predetermined structural modules, the first removable structural module being configured to attach to be carried by the automotive vehicle via a latching mechanism;
a sensor for detecting the presence of the first removable structural module attached to and carried by the automotive vehicle;
the computer system being configured receive a signal from the sensor identifying the first removable structural module and thereby determine the automotive vehicle to be in a first particular configuration associated with the first removable structural module,
the computer system being configured to automatically set a predetermined feature set for the vehicle based on the first vehicle being placed in the first particular configuration with the first removable structural module.

21. A structurally reconfigurable automotive vehicle of claim 20, wherein:
the first removable structural module is configured to attach to an exterior of the automotive vehicle via the latching mechanism;
the predetermined feature set is configured to affect operation of the first vehicle based on the first vehicle being placed in the first particular configuration with the first removable structural module attached to the exterior of the vehicle.

22. The method of claim 19, wherein the first use request is received from a first user and the second use request is received from a second user.

23. The method of claim 19, wherein the first use request and the second use request are received from a first user.

24. The method of claim 19, wherein the first vehicle has a unique vehicle identification number regardless of configuration of the first vehicle.

25. The method of claim 19, wherein said monitoring is carried out by an entity other than owners of said vehicles and users of said vehicles.

26. The method of claim 25, wherein said entity collects use fees for vehicle use and compensates an owner of a given vehicle for use by others.

27. The method of claim 19, wherein the different predetermined structural configurations are provided by different, removable structural modules.

28. The method of claim 27, wherein said different removable structural modules include:
a removable recreation module;
a removable delivery module;
a removable open box utility module;
a removable flat bed support module; and
a removable side rail module.

29. The method of claim 19, wherein at least one of the first predetermined feature set and the second predetermined feature set are automatically set at the first vehicle by an onboard computer of the vehicle based on an identification of the first particular configuration with a sensor system that automatically generates a signal indicative of vehicle configuration.

30. The method of claim 19, wherein at least one of the first predetermined feature set and the second predetermined feature set are automatically set at the first vehicle by an onboard computer of the vehicle based on an identification of the first particular configuration through communication between the first vehicle and at least one of multiple removable structural modules.

31. The method of claim 19, wherein the first predetermined feature set and the second predetermined feature set comprise one or more ride performance characteristics including one or more of a limitation on a maximum permissible acceleration, a firmness of ride of the vehicle, braking performance/sensitivity, a nominal suspension height, and an effective steering ratio.

32. The method of claim 19, wherein at least one of the first predetermined feature set and the second predetermined feature set comprises one or more human-machine interface elements at an instrument panel including one or more adaptive display elements, one or more graphical user interface elements, and one or more audio rendering elements.

33. The method of claim 19, comprising communicating a wireless signal comprising use-related or configuration-related information to the onboard computer or a mobile computing device for the first vehicle in the first particular configuration based on expected use or actual use of the first vehicle in the first particular configuration.

34. The method of claim 19, wherein the first vehicle in the first particular configuration has a first cargo carrying capability in addition to the predetermined first feature set, and wherein the first vehicle in the second particular configuration has a second cargo carrying capability in addition to the predetermined second feature set, the first cargo carrying capability being different from the second cargo carrying capability.

35. The method of claim 19, wherein the first particular configuration of the first vehicle is attained with providing a first removable structural module having a first cargo carrying capability for the first vehicle having a first unique vehicle identification number.

36. The method of claim 35, wherein the first removable structural module has a first unique module identification number.

37. The method of claim 36, comprising:
receiving a third use request for a vehicle in the first particular configuration; and
selecting a second vehicle with a second unique vehicle identification number different from the first unique vehicle identification number to be provided with the first removable structural module having the first unique module identification number,
the second vehicle with the second unique vehicle identification number together with the first removable structural module having the first unique module identification number together providing the first particular configuration.

38. The method of claim 1, wherein the first removable structural module is one of a removable recreation module, a removable delivery module, a removable open box utility module, a removable flat bed support module, and a removable side rail module.

39. The method of claim 19, wherein the first removable structural module is one of a removable recreation module, a removable delivery module, a removable open box utility module, a removable flat bed support module, and a removable side rail module.

* * * * *